United States Patent
Graefe

(10) Patent No.: US 9,594,804 B2
(45) Date of Patent: Mar. 14, 2017

(54) DYNAMIC REORDERING OF OPERATIONS IN A QUERY PLAN

(75) Inventor: Goetz Graefe, Madison, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 13/218,898

(22) Filed: Aug. 26, 2011

(65) Prior Publication Data

US 2013/0054567 A1 Feb. 28, 2013

(51) Int. Cl.
*G06F 17/30* (2006.01)

(52) U.S. Cl.
CPC .............. *G06F 17/30463* (2013.01)

(58) Field of Classification Search
USPC ........................ 707/713, 718, 719
See application file for complete search history.

(56) References Cited

U.S. PATENT DOCUMENTS

| | | | |
|---|---|---|---|
| 6,567,802 B1 | 5/2003 | Popa et al. | |
| 7,321,888 B2 | 1/2008 | Day et al. | |
| 7,774,336 B2 * | 8/2010 | Beyer et al. | 707/718 |
| 2005/0060292 A1 * | 3/2005 | Day et al. | 707/3 |
| 2006/0218123 A1 * | 9/2006 | Chowdhuri et al. | 707/2 |
| 2010/0281013 A1 | 11/2010 | Graefe | |
| 2010/0306212 A1 | 12/2010 | Tsirogiannis et al. | |
| 2010/0332472 A1 * | 12/2010 | Graefe | G06F 17/30463 707/736 |

OTHER PUBLICATIONS

Arcangeli, J. P., et al., An adaptive Hash Join Algorithm using Mobile Agents, pp. 14, published in 2002, English.

Graefe, Goetz, New algorithms for join and grouping operations, Hewlett-Packard Laboratories, dated Feb. 28, 2011—1 AM, pp. 24, published in English.

Li, Quanzhong et al., Adaptively Reordering Joins during Query Execution, Data Engineering, 2007, ICDE 2007, IEEE 23rd International Conference, pp. 26-35, Conference date: Apr. 15-20, 2007, published in English.

Vidal, Maria-Esther, et al., Efficiently Joining Group Patterns in SPARQL Queries, found at <http://axel.deri.ie/publications/vida-etal-2010eswc.pdf >, published 2010, pp. 15, published in English.

* cited by examiner

*Primary Examiner* — Amresh Singh
(74) *Attorney, Agent, or Firm* — International IP Group, PLLC

(57) ABSTRACT

There is provided a computer-implemented method of dynamically reordering operations in a query plan. An exemplary method comprises processing a first set of tuples according to a first operation. The query plan is pipelined and specifies that the first operation generates input for a second operation. The query plan further specifies that the second operation is executed after the first operation. The computer-implemented method further includes determining that the second operation is to precede the first operation based on a specified policy. The computer-implemented method further includes executing the second operation for a second set of tuples before executing the first operation for the second set of tuples. The second operation generates an input for the first operation. The first operation is executed after the second operation.

17 Claims, 5 Drawing Sheets

100

200

DYNAMIC REORDERING OF OPERATIONS IN A QUERY PLAN

BACKGROUND

Database queries are executed according to a query execution plan. The terms query execution plan, query plan, and plan, are used interchangeably herein. Query plans can be generated manually, or automatically. Automatic methods include software tools, computer programs, applications, software generators, and optimization. Optimization is similar to a compiler process for source code. However, where the compiler generates an executable computer program, the optimizer generates the query execution plan. The optimization is typically based on a current state of the database. The current database state may be represented in table and index definitions, table sizes, histogram statistics, etc. Optimization is a complex technology, and includes planning and statistics techniques. The planning techniques are similar to those used in artificial intelligence technology. However, one query may map to a number of alternate query execution plans. While all the alternate plans provide the same result, the efficiency of each plan may vary depending on the state of the database during execution. The optimizer tries to choose an efficient plan, but the database state is dynamic, and may vary between optimization and execution. As such, the plan may include inefficiencies. Plans generated by other automated means, and manually generated plans may also include these inefficiencies. However, typical approaches in improving query performance modify the techniques involved in optimization.

BRIEF DESCRIPTION OF THE DRAWINGS

Certain exemplary embodiments are described in the following detailed description and in reference to the drawings, in which.

DETAILED DESCRIPTION

Figure 1:
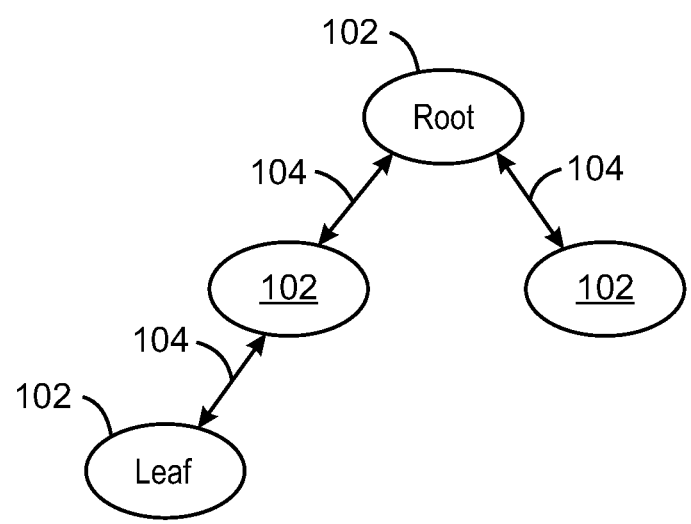
FIG. 1 is a block diagram of a query execution plan, according to an embodiment of the present techniques.

Query execution plans include operations which output tuples for input to another operation. The terms tuple, record, and row are used interchangeably herein. The operations typically perform database functions, some of which are described in greater detail below. Query execution plans may be inefficient because the optimizer selects a bad query plan due to incorrect estimates in the size of an intermediate query result. The intermediate query result is the set of tuples output by each operation. When the optimizer is wrong about such an estimate, the optimizer may select a query execution plan that is computationally expensive in comparison to other possible plans. When multiple estimates are wrong, the computational cost can be magnified.

Query execution plans may also be inefficient through design error. For example, a software engineer may code the plan manually, introducing the possibility of human error. Additionally, map-reduce, such as PIG and similar execution frameworks, may generate plans automatically. Automatically generated plans may also include design errors that make executing the plan inefficient.

Typically, the plan is followed by executing all of the operations in a sequence laid out in the plan. The typical techniques for executing a plan include pipelining, indices, scans, and networking. In pipelining, one operation produces one or more records and hands each record to the next operation upon completion. The next operation consumes and processes records before the first operation produces another one or more records. Index techniques use indices to retrieve rows from tables and views more quickly than row-by-row scanning. Whereas scans retrieve every row, index techniques perform a sorted scan on an order-preserving data structure. This approach results in fewer rows being retrieved. Networking is performed for queries run on parallel systems, parallel processors, etc.

Some approaches to improving efficiency enable variances from the query execution plan. In one approach, tuple routing is used during execution. In tuple routing, if a record is to be processed by multiple further operations, a dynamic decision as to which operation the record is sent to first, second, etc. However, tuple routing incurs high execution overheads. Another approach that varies from the original query plan may change the sequence of operations during execution. However, this approach is limited to operators implemented with indexed nested loop joins. Each of the operations is typically implemented using some algorithm. For example, join operations are typically implemented with algorithms, such as hash-join, merge join, nested loops join, indexed nested loops join, and a generalized join, described in greater detail below. As such, the typical plan is likely to use other types of join algorithms than the indexed nested loop join. Further, the plan may include aggregate operators, which are not implemented by the indexed nested loop join.

In one embodiment, the sequence in which two join or aggregate operators are executed may be changed. This may be done in order to reduce the amount of work done to process the query. If database query processing employs compile-time logic to assemble a query execution plan that specifies which operation's output will be which other operation's input, the run-time might modify the sequencing of the operations in the query execution plan. Specifically, in sort-based query execution with multiple operations exploiting the same sort order, the sequence of operations can be modified between value packets without wasted or repeated effort. In hash-based query execution with multiple operations exploiting the same hash function applied to the same data attributes, the sequence of operations can be modified between partitions. In addition to database query processing, dynamic sequencing of operations also applies to other data processing using dataflow plans including map-reduce plans. Dynamic re-sequencing may also be applied to execution plans specified by users, applications, generators, or other software tools. The boundaries at which dynamic sequencing of operations is possible without wasted or repeated effort also enable pause and resume functionality without wasted or repeated effort. Pause and resume functionality may be used for workload management.

FIG. 1 is a block diagram of a query execution plan 100, according to an embodiment of the present techniques. As shown, the plan 100 may be a dataflow graph, e.g., a directed graph, with operations 102 as nodes, and intermediate query results 104 as edges. Intermediate query results 104 are also referred to herein as intermediate results 104. When in sort order, the intermediate results 104 may include value packets. A value packet is a contiguous set of rows with same sort key value. Operations 102 may be configured to handle individual tuples of the intermediate results 104, or value packets. The root node of the graph is usually an operation that transfers query results to the user or application program running the query.

Leaf node operations are typically scans. A scan is an operation 102 that retrieves every row of a table and outputs some intermediate query result 104. The operations 102 between the leaf nodes and the root node include a number of different operations 102, including join and aggregation operations. Join operators may include inner joins, outer joins, and semi-joins. The join algorithms, described above, and minor variants thereof, may be used for the inner join, the three forms of the outer join, and the four forms of semi-joins. These algorithms may also support set operations, such as intersection, union, left & right & symmetric difference. Left & right & symmetric difference are standard operations on sets. The left difference is a standard set difference. The right difference is the opposite of the left difference. Symmetric difference is the union of the two differences. Aggregation operators may be implemented using hash aggregation, stream aggregation, index nested loops aggregation, and a generalized aggregation, described in greater detail below. All aggregation algorithms may be used for duplicate removal from the intermediate result 104, such as is performed for "DISTINCT" queries in SQL. These algorithms are also used for aggregation, such as is performed for "GROUP BY" queries in SQL. The algorithms may also cache parameters and results of functions, such as computationally-expensive, user-defined functions.

As described above, join and aggregation operations typically use one of three types of algorithm. For joins, the hash join, merge join, and indexed nested loops join, may be used. The hash join exploits differences in the sizes of the join inputs. The merge join exploits sorted inputs. The indexed nested loops join exploits an index on its inner input. Typically, an optimizer selects from among these algorithms, based on which provides a lowest computational cost. However, the generalized join algorithm may be used in place of merge join and hash join. The generalized join algorithm may perform at a comparable cost, while combining aspects of the three typical join algorithms. Like merge join, the generalized join algorithm exploits sorted inputs. Like hash join, it exploits different input sizes for unsorted inputs. Further, the in-memory components of the generalized join algorithm may use an order-preserving data structure, such as a B-tree index. If the database contains a B-tree index for one, or both, of the inputs, the generalized join can exploit persistent indexes instead of temporary in-memory indexes. Using database indexes to match input records, the generalized join algorithm may also replace the indexed nested loops join. For aggregation operations, an index-based, sort-based, or hash-based algorithm may be used typically. An algorithm similar to the generalized join may be used for aggregation. More specifically, the generalized aggregation algorithm may be used to support aggregation operations for grouping and duplicate elimination.

Automatically generated query plans may include map and reduce operations. The map operation may be similar to a join if another dataset is the foundation of the mapping. Advantageously, the map-reduce framework is general. As such, various kinds of mapping may be realized by adding appropriate customization code to the framework. However, if a computation is the foundation of the mapping, the map operation may be similar to a user-defined function. The reduce operation may be similar to an aggregation operation.

Re-sequencing operations within a plan may be advantageous when consecutive operations have shared sort orders. Having shared sort orders means that the inputs to both operations are sorted using the same sort key. In other words, two generalized join operations may process their inputs in a sort order that is based on the same sort key column. As such, the sequence in which the operations are executed may be changed to gain efficiency in execution.

Figure 2:
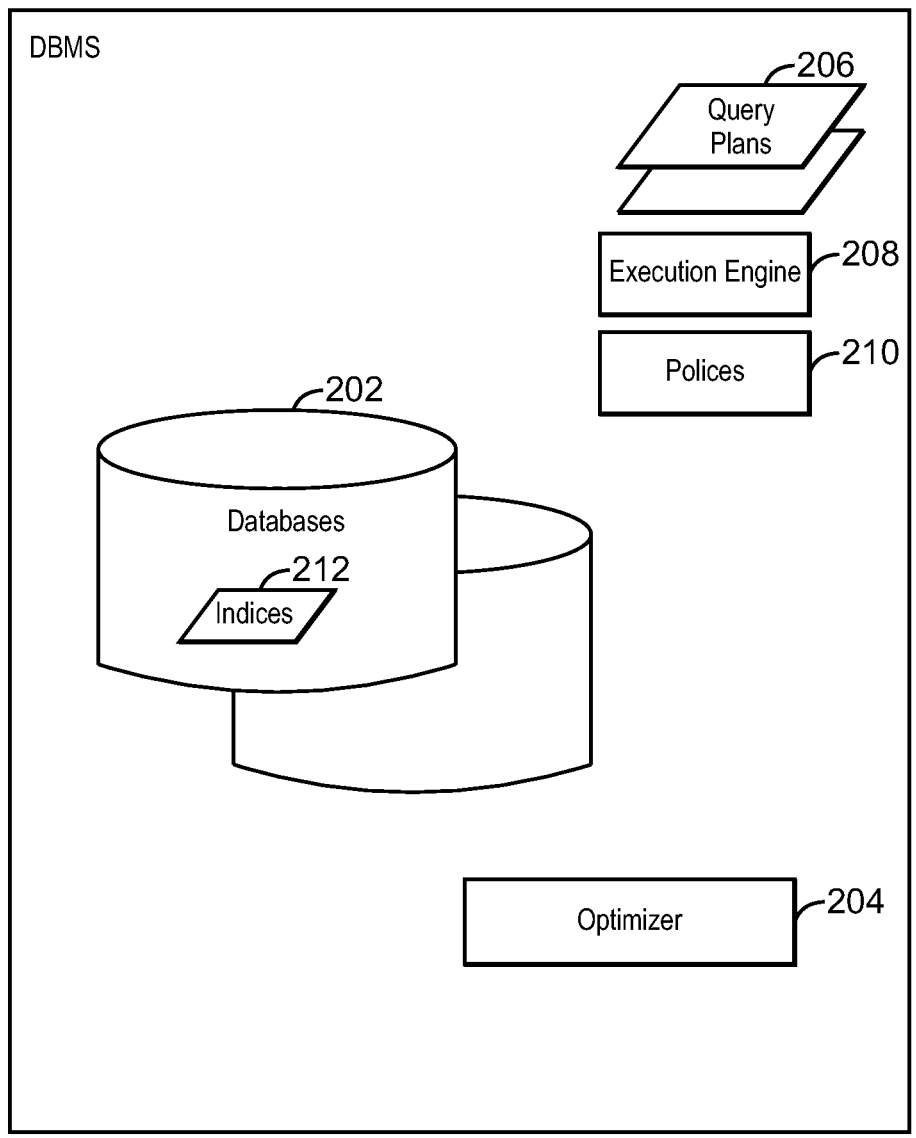
FIG. 2 is a block diagram of a database management system (DBMS), according to an embodiment of the present techniques.

FIG. 2 is a block diagram of a database management system (DBMS) 200, according to an embodiment of the present techniques. The DBMS 200 may include databases 202, an optimizer 204, query plans 206, an execution engine 208, and policies 210. The databases 202 may include user data organized into tables, rows and columns, typical of a relational DBMS. The databases 202 may include indices 212, which identify one or more rows in a particular database table, view, etc., based on an index key. Identifying the one or more rows may enable direct access to the one or more rows. The optimizer 204 may be software that generates the query plans 206, which are implemented at runtime by the execution engine 208. Further, the execution engine 208 may re-sequence operations in the query plan, where re-sequencing improves the efficiency of the execution. In one embodiment, specific policies 210 may be used to determine whether or not to re-sequence two operations. The policies 210 may indicate that operations are re-sequenced when the data volume processed by the plan 206 is reduced by the re-sequencing. For example, in one embodiment, the policies 210 may specify that an operation that is more restrictive, i.e., produces fewer rows of output, is to execute before another operation that is less restrictive. The policies 210 may also specify that where a sort order of an operation input is supported by an index, that operation is executed before another operation without such an index. Where both operations are supported by an index, the policies 210 may specify that the more restrictive operation is executed before the less restrictive operation.

Figure 3:
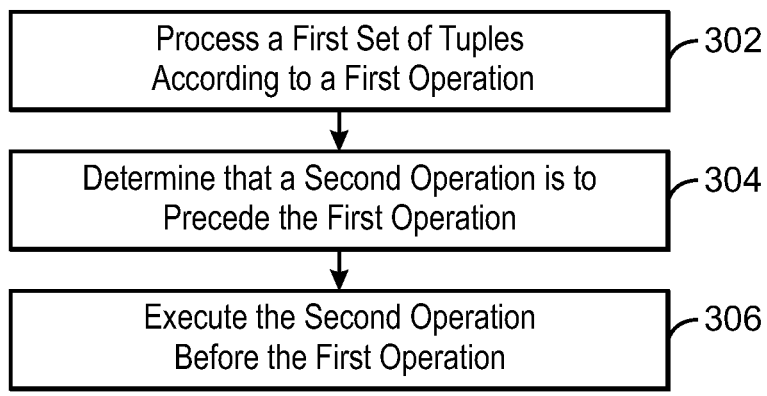
FIG. 3 is a process flow diagram showing a computer-implemented method 300 for executing a query plan according to an embodiment of the present techniques.

FIG. 3 is a process flow diagram showing a computer-implemented method 300 for executing a query plan 206 according to an embodiment of the present techniques. The method may be performed by the execution engine 208. It should be understood that the process flow diagram is not intended to indicate a particular order of execution.

The method may begin at block 302, where the execution engine 208 processes a first set of tuples according to a first operation. The query plan 206 may include a first operation and a second operation. The query plan 206 specifies that the second operation is to be executed after the first operation. Further, the query plan 206 specifies that the output of the first operation is input to the second operation. Additionally, the inputs to the first operation and the second operation may have shared sort orders. The first value packet may have the sort key that is first in sort order for the intermediate query result input to the first operation. After processing the first set of tuples of the operation's input, the execution engine 208 may enable the operations to be re-sequenced. In this way, duplicate processing of the first value packet by the first operation may be avoided.

At block 304, the execution engine 208 may determine that the second operation is to precede the first operation based on a specified policy. For example, the first operation and the second operation may both be implemented using generalized join algorithms. However, the second operation may apply a filter that reduces the number of tuples output. As such, the execution engine may determine that the second operation is to be executed before the first operation.

Accordingly, at block 306, the execution engine 208 may execute the second operation before the first operation. The first operation may be performed using the output of the second operation. Because the first value packet is already processed by the first operation, the first operation may output, without further processing, all tuples with the sort key value of the first value packet.

Figure 4:
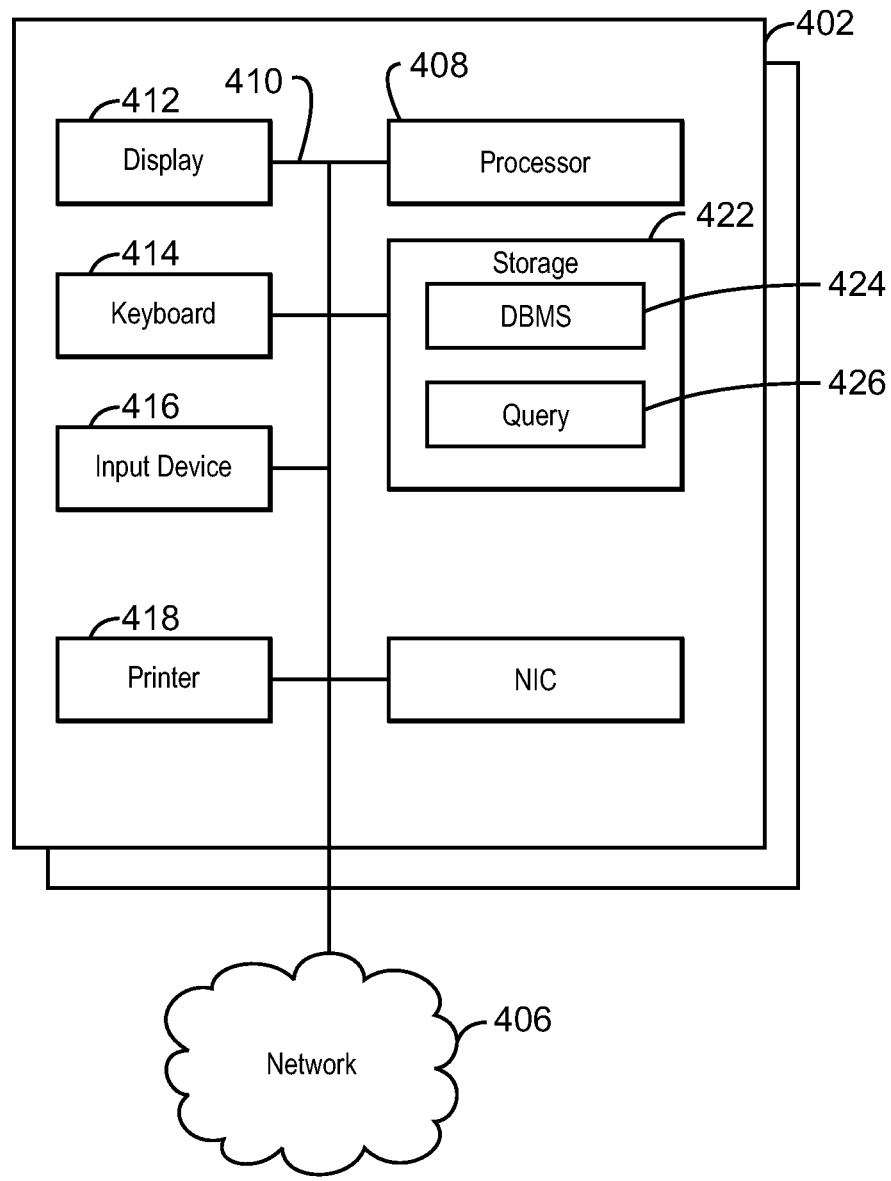
FIG. 4 is a block diagram of a system for executing a query plan in accordance with an embodiment of the present techniques.

FIG. 4 is a block diagram of a system 400 for executing a query plan in accordance with an embodiment of the present techniques. The functional blocks and devices shown in FIG. 4 may comprise hardware elements, software elements, or some combination of software and hardware. The hardware elements may include circuitry. The software elements may include computer code stored as machine-readable instructions on a non-transitory, computer-readable medium. Additionally, the functional blocks and devices of the system 400 are but one example of functional blocks and devices that may be implemented in an example. Specific functional blocks may be defined based on design considerations for a particular electronic device.

The system 400 may include a database server 402, in communication with clients 404, over a network 406. The database server 402 may include a processor 408, which may be connected through a bus 410 to a display 412, a keyboard 414, an input device 416, and an output device, such as a printer 418. The input devices 416 may include devices such as a mouse or touch screen. The computational nodes 402 may also be connected through the bus 410 to a network interface card 420. The network interface card 420 may connect the computational nodes 402 to the network 406. The network 406 may be a local area network, a wide area network, such as the Internet, or another network configuration. The network 406 may include routers, switches, modems, or any other kind of interface device used for interconnection. In one example, the network 406 may be the Internet.

The database server 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory. The storage 422 may include the machine readable instructions used in examples of the present techniques. In an example, the storage 422 may include a DBMS 424 and a query 426. The client 404 may submit the query 426 to the database server 402 for execution.

The DBMS 424 may generate a query plan for the query. Further, the DBMS 424 may, during execution of the query plan, re-sequence two operations in subsequent execution order based on a set of specified policies. The re-sequencing of the two operations may improve the efficiency of the query plan execution.

Figure 5:
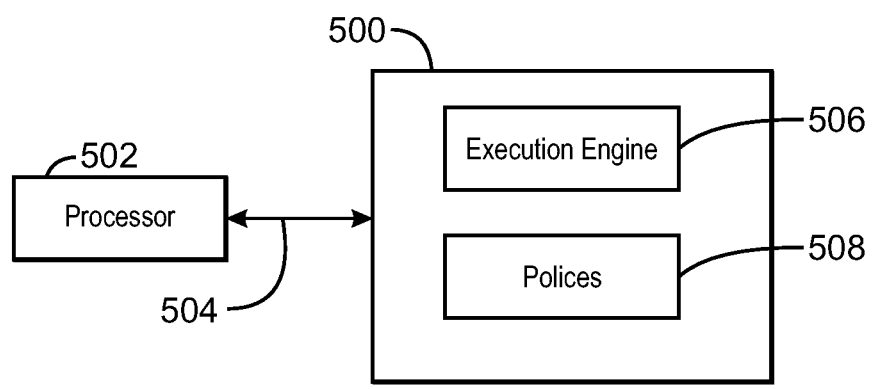
FIG. 5 is a block diagram showing a tangible, machine-readable medium that stores code adapted to facilitate executing a query plan according to an exemplary embodiment of the present techniques.

FIG. 5 is a block diagram showing a tangible, machine-readable medium that stores code adapted to facilitate executing a query plan 206 according to an exemplary embodiment of the present techniques. The tangible, machine-readable medium is generally referred to by the reference number 500. The tangible, machine-readable medium 500 may correspond to any typical storage device that stores computer-implemented instructions, such as programming code or the like. Moreover, tangible, machine-readable medium 500 may be included in the storage 422 shown in FIG. 4. When read and executed by a processor 502, the instructions stored on the tangible, machine-readable medium 500 are adapted to cause the processor 502 to execute the query plan 206.

The tangible, machine-readable medium 500 stores an execution engine 506 that re-sequences the execution of two operations that are specified by the query plan to be executed in a specific order. Further, the output of one operation is to be input to the other operation, and the inputs of both operations have shared sort orders. The re-sequencing is performed based on a set of specific policies 508.

What is claimed is:

1. A computer-implemented method of dynamically reordering operations in a query plan, comprising:
    processing a first set of tuples according to a first operation supported by a first sort key, wherein the query plan specifies that the first operation generates input for a second operation supported by a second sort key, the second operation is executed after the first operation, and the query plan is pipelined; and
    determining that the second sort key is index supported and that the first sort key is not index supported, and based on the determining:
    resequencing the first operation and the second operation so that the second operation is to precede the first operation; and
    executing the second operation for a second set of tuples before executing the first operation for the second set of tuples, wherein the second operation generates an input for the first operation.

2. The method recited in claim 1, comprising:
    processing a third set of tuples according to the second operation;
    determining that the first operation is to precede the second operation based on the specified policy; and
    executing the first operation for a fourth set of tuples before executing the second operation for the fourth set of tuples, wherein the first operation generates the input for the second operation.

3. The method recited in claim 1, comprising:
    determining that a third operation is to precede the first operation based on the specified policy, wherein the query plan specifies that the third operation is executed after the second operation; and
    executing the third operation for the second set of tuples before executing the first operation for the second set of tuples, wherein the third operation generates the input for the first operation.

4. The method recited in claim 1, wherein the first operation and the second operation comprise corresponding sort-based algorithms, and wherein the first set of tuples and the second set of tuples comprise a value packet.

5. The method recited in claim 1, wherein the first operation and the second operation comprise a hash function on a shared set of attributes, and wherein the first set of tuples shares a first partition, and wherein the second set of tuples shares a second partition.

6. The method recited in claim 1, wherein the first operation and the second operation comprise a sorted scan of an order-preserving data structure.

7. The method recited in claim 6, wherein the order-preserving data structure comprises a B-tree index.

8. The method recited in claim 1, wherein the first operation and the second operation are implemented using one of the following algorithms:

merge join;
generalized join;
generalized aggregation; or
a user-defined function.

9. A computer system for executing a query plan, the computer system comprising:
a processor that is adapted to execute stored instructions; and
a memory device that stores instructions, the memory device comprising:
computer-implemented code adapted to process a first set of tuples according to a first operation supported by a first sort key, wherein the query plan specifies that the first operation generates input for a second operation supported by a second sort key, the second operation is executed after the first operation, and the query plan is pipelined;
computer-implemented code adapted to determine that the second sort key is index supported and the first sort key is not index supported and, based on the determining, resequence the first operation and the second operation so that the second operation is to precede the first operation; and
computer-implemented code adapted to execute the second operation for a second set of tuples before executing the first operation for the second set of tuples in response to determining that the second operation is to precede the first operation, wherein the second operation generates an input for the first operation.

10. The computer system recited in claim 9, wherein the memory device comprises:
computer-implemented code adapted to determine that a third operation is to precede the first operation based on the specified policy, wherein the query plan specifies that the third operation is executed after the second operation; and
computer-implemented code adapted to execute the third operation for the second set of tuples before executing the first operation for the second set of tuples, wherein the third operation generates the input for the first operation.

11. The computer system recited in claim 9, wherein the first operation and the second operation comprise corresponding sort-based algorithms, and wherein the first set of tuples and the second set of tuples comprise a value packet.

12. The computer system recited in claim 9, wherein the first operation and the second operation comprise a hash function on a shared set of attributes, and wherein the first set of tuples shares a first partition, and wherein the second set of tuples shares a second partition.

13. The computer system recited in claim 9, wherein the first operation and the second operation comprise a sorted scan of an order-preserving data structure.

14. The computer system recited in claim 13, wherein the order-preserving data structure comprises a B-tree index.

15. The computer system recited in claim 9, wherein the first operation and the second operation are implemented using one of the following algorithms:
merge join;
generalized join; or
generalized aggregation.

16. A tangible, non-transitory, machine-readable medium that stores machine-readable instructions executable by a processor to execute a query plan, the tangible, non-transitory, machine-readable medium comprising:
machine-readable instructions that, when executed by the processor, process a first set of tuples according to a first operation supported by a first sort key, wherein the query plan specifies that the first operation generates input for a second operation supported by a second sort key, the second operation is executed after the first operation, and the query plan is pipelined;
machine-readable instructions that, when executed by the processor, determine that the second sort key is index supported and the first sort key is not index supported and, based on the determining, resequence the first operation and the second operation so that the second operation is to precede the first operation; and
machine-readable instructions that, when executed by the processor, execute the second operation for a second set of tuples before executing the first operation for the second set of tuples wherein the second operation generates an input for the first operation.

17. The tangible, non-transitory, machine-readable medium recited in claim 16, comprising:
machine-readable instructions that, when executed by the processor, determine that a third operation is to precede the first operation based on the specified policy, wherein the query plan specifies that the third operation is executed after the second operation; and
machine-readable instructions that, when executed by the processor, execute the third operation for the second set of tuples before executing the first operation for the second set of tuples, wherein the third operation generates the input for the first operation.

* * * * *